United States Patent [19]
Anderson et al.

[11] Patent Number: 6,163,702
[45] Date of Patent: Dec. 19, 2000

[54] METHODS AND SYSTEMS FOR SOLVING THE PAGING PROBLEM FOR A MULTILINE FIXED CELLULAR SYSTEM

[75] Inventors: Keith William Anderson, Durham, N.C.; Helena Persson, Stockholm, Sweden; Paul H. Hardin, Sr., Apex, N.C.

[73] Assignee: Ericsson Inc., Research Triangle Park, N.C.

[21] Appl. No.: 09/074,206

[22] Filed: May 7, 1998

Related U.S. Application Data

[63] Continuation of application No. 09/048,871, Mar. 26, 1998.
[51] Int. Cl.$^7$ .................................................. H04Q 7/38
[52] U.S. Cl. ........................................... 455/458; 455/567
[58] Field of Search ..................................... 455/458, 567, 455/426, 554, 555, 445; 379/164, 165

[56] References Cited

U.S. PATENT DOCUMENTS

| | | | |
|---|---|---|---|
| 4,890,315 | 12/1989 | Bendixen et al. | 455/554 |
| 5,530,736 | 6/1996 | Comer et al. | 455/554 |
| 5,544,223 | 8/1996 | Robbins et al. | 379/58 |
| 5,544,227 | 8/1996 | Blust et al. | 455/426 |
| 5,787,355 | 7/1998 | Bannister et al. | 455/458 |

OTHER PUBLICATIONS

WO 95/29565, Nothern Telecom Ltd., Method and Apparatus for RF Linking To Private Branch Exchange Connecting Local Subscribers, Apr. 22, 1994. See p. 8, line 1—p. 9, line 37; p. 10, line 27—p. 13, line 35.

WO 96/24225, Qualcomm Inc., Concentrated Subscribed System For Wireless Local Loop, Jan. 31, 1995. See p. 5, line 4—p. 6, line 3; p. 7, line 16—p. 8, line 2; p. 8, line 23—p. 9, line 36; and p. 10, line 32—p. 11, line 3.

*Primary Examiner*—William G. Trost
*Attorney, Agent, or Firm*—Wood, Phillips, VanSanten, Clark & Mortimer

[57] ABSTRACT

The present invention relates to multiline fixed cellular systems in which a plurality of plain ordinary telephone service connections utilize a plurality of cellular terminals to conduct radio communication. In particular, the present invention discloses novel methods and systems of solving the paging problem in multiline fixed cellular systems. In the invention, a plurality of plain ordinary telephone service connections having an upper page range and a lower page range are connected with a fixed cellular switch. The fixed cellular switch is connected with a plurality of cellular terminals which are capable of conducting radio communication with a cellular network. A control unit is provided connected with the fixed cellular switch and the cellular terminals for switching an activated plain ordinary telephone service connection to an available cellular terminal when an incoming page falls within the upper page range and lower page range.

23 Claims, 4 Drawing Sheets

METHODS AND SYSTEMS FOR SOLVING THE PAGING PROBLEM FOR A MULTILINE FIXED CELLULAR SYSTEM

This application is a continuation of application Ser. No. 09/048,871, filed on Mar. 26, 1998, which is herein incorporated by reference.

FIELD OF THE INVENTION

The present invention relates generally to multiline fixed cellular systems, and more particularly, to methods and systems for scanning incoming pages and connecting an available cellular terminal to a validly paged plain ordinary telephone service connection.

BACKGROUND OF THE INVENTION

Fixed cellular is a new facet of cellular technology. In general, fixed cellular is a means by which a plurality of plain ordinary telephone service connections are connected with cellular terminals. The cellular terminals are then capable of conducting radio communication with a cellular network. The multiline fixed cellular network is usually connected to a public switched telephone network. Fixed cellular is mainly being used in developing countries where the cost of running land lines is prohibitive. In these markets, fixed cellular provides a less expensive method of providing phone service to both residential and business customers. In addition, a multiline fixed cellular system may be utilized in many different special-use applications.

Multiline is one facet of fixed cellular technology. In a multiline system, a number of cellular terminals are connected to a generally large number of plain ordinary telephone service connections. The cellular terminals spend their time in one of two modes. In the first mode, a cellular terminal is on a call and acts much like a normal mobile station, that is, all transactions that occur are meant for the mobile on the call. Therefore, when a plain ordinary telephone service connection is validly paged by a radio signal from the cellular network, the plain ordinary telephone service connection utilizes a cellular terminal to conduct communication.

In the second mode of operation, a cellular terminal constantly monitors incoming pages on a dedicated control channel. Since there are more plain ordinary telephone service connections than there are cellular terminals, each cellular terminal in a multiline fixed cellular terminal unit must be able to respond to many different identification numbers. The identification numbers are used to identify each plain ordinary telephone service connection connected to the system. During operation, the dedicated control channel receives a plurality of frames that could contain a page for the cellular terminal. Each frame may contain up to five incoming pages and the rules of PCH displacement dictate that a cellular terminal may have to check up to eight frames in order to locate incoming pages. That means that for each plain ordinary telephone service connection that the cellular terminal is monitoring pages for the cellular terminal may have to perform 40 identification number comparisons every superframe. Preferred multiline fixed cellular network systems are expected to support up to at least 288 plain ordinary telephone service connections. This would require a total of 11,520 (five incoming pages×eight frames×288 plain ordinary telephone service connections) comparisons to occur in a hyperframe.

Currently, cellular terminals do not have the processing power to perform this high number of comparisons in the time required. The incoming pages come in at such a fast rate that the cellular terminals' processor cannot handle that many comparisons in that short a time frame. To make matters worse, the pages for different plain ordinary telephone service connections occur in different frames within the superframe. As a result, the cellular terminal would have to use more processing power to determine which frames to check against the plain ordinary telephone service connection identification numbers. This could require as much processing power as checking each of the plain ordinary telephone service connection identification numbers themselves.

There are several proposed methods to attempt to reduce the processing power required by the cellular terminals to perform the large number of identification number comparisons. The first method to reduce the processing power required by cellular terminals is to place all of the pages for a given cellular terminal in one frame. Although this would not reduce the number of identification number comparisons, it would greatly reduce the amount of processing power required to keep track of which identification number gets paged in which frame. The problem with this method is that it would require costly and time-consuming changes to existing base station technology.

Another method to reduce the processing power required by the cellular terminals would be to use subaddressing. Subaddressing is a method used by the mobile switching center in which the mobile switching center would send a page to the cellular terminal with a single identification number. If the identification number matches one that is assigned to the cellular terminal, the cellular terminal will check further addressing information to determine which plain ordinary telephone service connection the page is identifying. This would greatly reduce the number of identification number comparisons that the cellular terminals would have to perform, but current mobile switching centers do not support subaddressing, and are not expected to within the time frame which multiline fixed cellular systems will be introduced.

Another method to reduce the processing power required by the cellular terminals would be to perform a binary search through the identification numbers. If the cellular terminal were responsible for 288 identification numbers, this would require only ten identification number comparisons for each identification number contained within the frame. There may be up to 28 frames per superframe that may contain pages for the cellular terminal. This would greatly reduce the number of identification number comparisons required by the cellular terminal. The number of identification number comparisons for this method is 1,400 (five pages×ten comparisons×28 frames) per superframe. While the binary search algorithm is one of the better methods to reduce the processing power required, it would still require 1,400 comparisons per superframe. This presents a significant problem because it is expected that 1,400 identification number comparisons per superframe would still be outside of the realm of what the processing power of the cellular terminals could accomplish. In addition, increasing the number of identification numbers which the cellular terminal supports will increase the number of comparisons.

As such, a need exists for a multiline fixed cellular system that can support a plurality of plain ordinary telephone service connections and has the processing power to handle the fast incoming page rate.

SUMMARY OF THE INVENTION

The present invention discloses multiline fixed cellular methods and systems in which the cellular terminals use an indexing scheme to perform the required identification number comparisons. In the invention, the cellular terminals would only have to perform two comparisons for each identification number within a frame. In preferred embodiments, the identification numbers for a given cellular terminal will be limited by a certain number range, but the size of the range is arbitrary and limited only by the amount of memory available to the cellular terminals. In the invention, all identification numbers that are assigned to plain ordinary telephone service connections would exist within a range and hold a unique position within an identification number array. Each position within the array contains information as to whether or not the plain ordinary telephone service connection is a valid account for the multiline fixed cellular network or just a filler position that is within the range served by the multiline fixed cellular system, but not assigned to the multiline fixed cellular network. Therefore, the present invention discloses methods and systems that are capable of scanning a plurality of incoming pages and determine if an incoming page is identifying a valid plain ordinary telephone service connection for a large range of identification numbers.

The present invention discloses a method of scanning incoming pages in a multiline fixed cellular network that does not require the processing time needed by the prior methods. In the preferred method, a plurality of plain ordinary telephone service connections are provided that are indexed within an upper page range and lower page range. A plurality of cellular terminals in radio communication with a cellular network is also provided for conducting radio communication with the cellular network. The cellular terminals are connected with a means for selectively connecting a validly paged plain ordinary telephone service connection with an available cellular terminal. In operation, a plurality of incoming pages are compared with the upper page range and the lower page range with the cellular terminals. When an incoming page is determined to be within the upper page range and the lower page range, the means for selectively connecting connects a validly paged plain ordinary telephone service connection with an available cellular terminal. Therefore, when an incoming page falls between the upper page range and the lower page range, the validly paged plain ordinary telephone service connection is capable of utilizing an available cellular terminal to conduct telecommunication with a public switched telephone network.

Preferred embodiments of the present method may further comprise the step of utilizing the difference between the upper page range and the incoming page to connect the validly paged plain ordinary telephone service connection with an available cellular terminal. The multiline fixed cellular system is programmed to ignore the incoming pages that fall outside the upper page range and the lower page range. The step of selectively connecting a paged plain ordinary telephone service connection with an available cellular terminal comprises a control unit connected with a fixed cellular switch in the preferred method. The control unit operates the fixed cellular switch to connect the validly paged plain ordinary telephone service connection with an available cellular terminal.

The present invention also discloses a multiline fixed cellular communication system which has a plurality of plain ordinary telephone service connections having an upper identification number range and a lower identification number range. A fixed cellular switch is connected with each plain ordinary telephone service connection and a control unit. A plurality of cellular terminals are connected with the fixed cellular switch and the control unit. In the multiline fixed cellular system, the control unit utilizes the fixed cellular switch to connect a validly paged plain ordinary telephone service connection with an available cellular terminal. During operation, each of the plurality of cellular terminals scans a plurality of incoming pages and notifies the control unit of the validly paged plain ordinary telephone service connection. A validly paged plain ordinary telephone service connection is an incoming page that falls within the upper identification number range and the lower identification number range. The cellular terminals utilize the difference between the upper identification number range and the incoming page to identify the validly paged plain ordinary telephone service connection. Therefore, during operation of the multiline fixed cellular system, if an incoming page falls within the upper identification number range and the lower identification number range, the control unit causes the fixed cellular switch to connect the validly paged plain ordinary telephone service connection with an available cellular terminal.

DETAILED DESCRIPTION OF THE PREFERRED EMBODIMENTS

Figure 1:
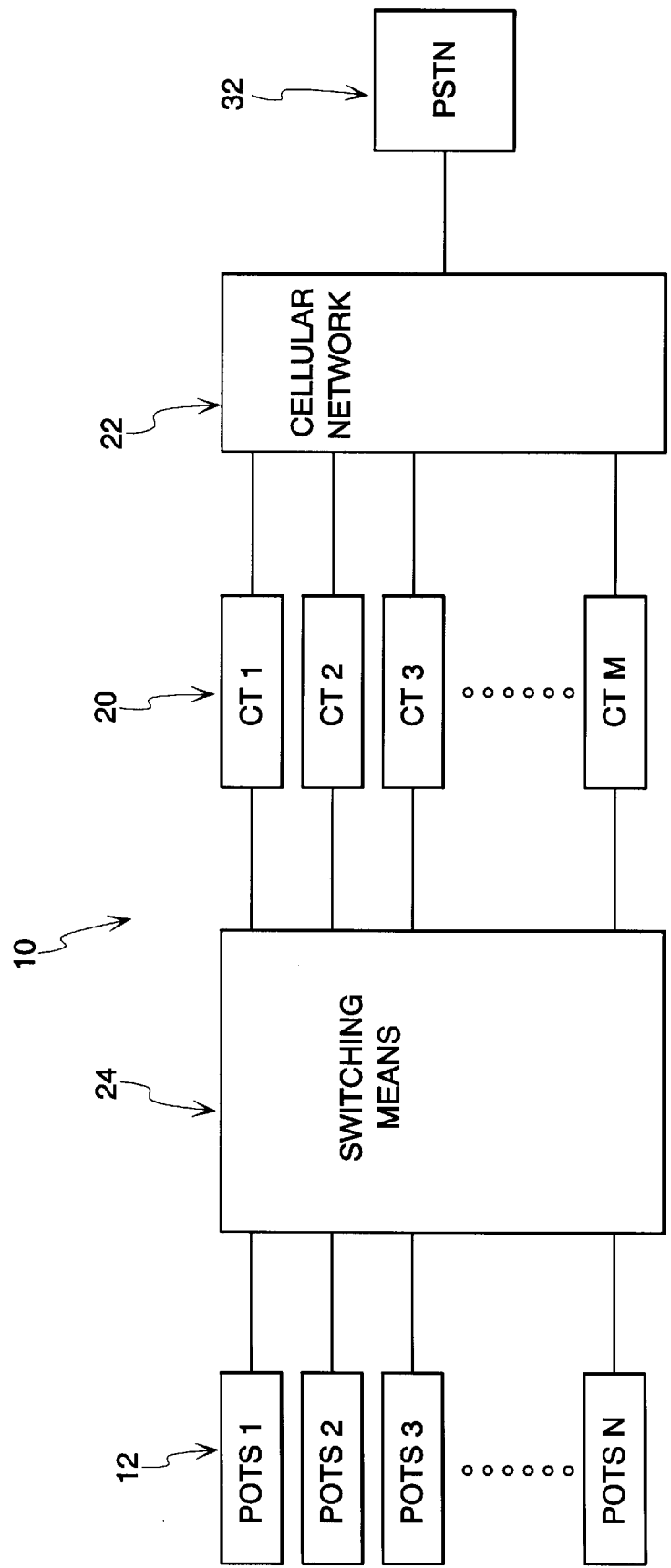
FIG. 1 is a diagrammatic representation of a preferred multiline fixed cellular system.

Referring to FIG. 1, a preferred method of scanning incoming pages in a multiline fixed cellular network 10 is disclosed in detail below. In the preferred method, a plurality of plain ordinary telephone service connections 12 are provided that are indexed 18 within an upper page range 14 and a lower page range 16 (see FIG. 2). The range of pages that the upper page range 14 and the lower page range 16 can cover depends on the needs and location of the particular multiline fixed cellular network 10. In the multiline fixed cellular network 10, one index 18 could be used and would contain the identification numbers of each plain ordinary telephone service connection 12 connected with the multiline fixed cellular network 10. In other preferred embodiments, a plurality of indexes 18 could be used by dividing the plurality of ordinary telephone service connections 12 into groups of identification numbers.

In the preferred method of scanning incoming pages, a plurality of cellular terminals 20 are provided that are in radio communication with a cellular network 22. The cellular terminals are connected with a means for selectively connecting 24 a validly paged plain ordinary telephone service connection 12 with an available cellular terminal 20. During operation, the preferred method utilizes the cellular terminals 20 to compare a plurality of incoming pages from the cellular network 22 with the upper page range 14 and the lower page range 16 which is stored in the cellular terminal 20. When the plurality of cellular terminals 20 determine that an incoming page falls within the upper page range 14 and the lower page range 16, the means for selectively connecting 24 a validly paged plain ordinary telephone service connection 12 connects the validly paged plain ordinary telephone service connection 12 with an available cellular terminal 20. The cellular network 16 is connected with a public switched telephone network in the preferred embodiment of the multiline fixed cellular network 10.

The preferred method of scanning incoming pages in a multiline fixed cellular network 10 may also comprise the step of utilizing the difference between the upper page range 14 and the incoming page to connect the validly paged plain ordinary telephone service connection 12 with the available cellular terminal 20. Using the difference between the upper page range 14 and the incoming page to connect a call reduces the processing time by allowing the multiline fixed cellular network 10 to make two comparisons to determine if an incoming page is identifying a plain ordinary telephone service connection 12 connected with the multiline fixed cellular network 10. In preferred methods, the multiline fixed cellular network 10 is programmed to ignore the incoming pages that fall outside the upper page range 14 and the lower page range 16. The preferred embodiment may also include the step of comparing the difference between the upper page range 14 and the incoming page to notify a user of an invalidly paged plain ordinary telephone service connection 12. An invalidly paged plain ordinary telephone service connection 12 may comprise a disactivated plain ordinary telephone service connection 12. These inactive plain ordinary telephone service connections 12 might not be assigned to a subscribing customer or may have been placed on an inactive status for a particular reason by the operator of the multiline fixed cellular network 10.

Figure 2:
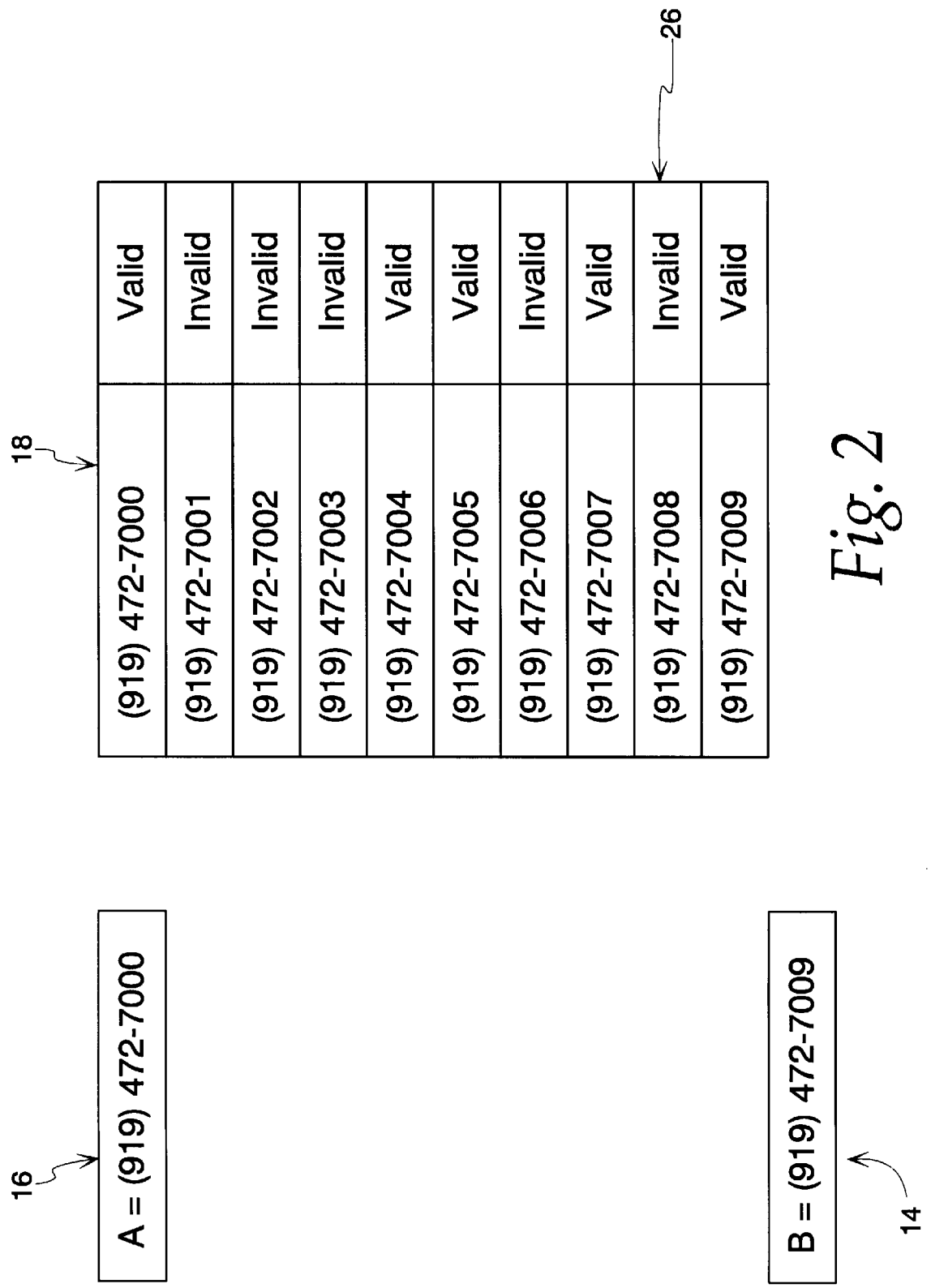
FIG. 2 illustrates an indexed array of plain ordinary telephone service connection identification numbers having an upper page range and a lower page range.
Figure 3:
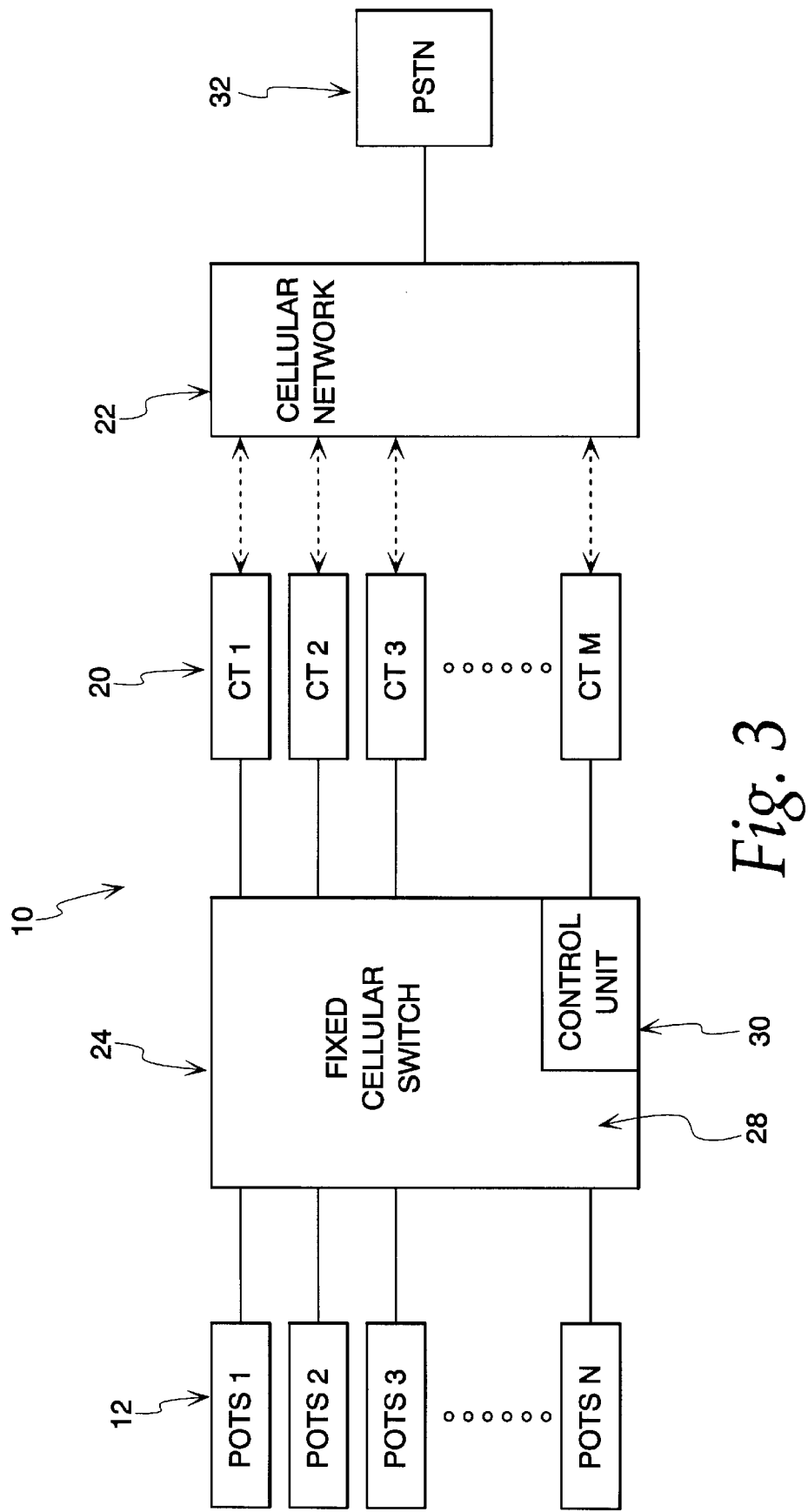
FIG. 3 is a detailed diagrammatic view of a preferred multiline fixed cellular system.

Referring to FIG. 3, wherein like-numbered elements identify equivalent structures disclosed in FIG. 2, the means for selectively connecting 24 a plain ordinary telephone service connection 12 with an available cellular terminal 20 comprises a fixed cellular switch 28 integrally connected with a control unit 30. As disclosed, the control unit 30 is connected with the fixed cellular switch 28 in the same structure. However, those skilled in the art would recognize that the control unit may be connected with the fixed cellular switch 28 and the cellular terminals 20 in many suitable fashions. In operation, when the cellular terminals 20 indicate to the control unit 30 that an incoming page has identified a valid plain ordinary telephone service connection 12, the control unit 30 utilizes the fixed cellular switch 28 to connect the validly paged plain ordinary telephone service connection 12 with an available cellular terminal 20. Therefore, since the multiline fixed cellular network 10 is normally connected with a public switched telephone network 32, this allows users of the multiline fixed cellular network 10 to conduct telecommunication with any person connected with the public switched telephone network 32.

Referring to FIG. 3, another preferred embodiment of the method of controlling a multiline fixed cellular system 10 is set forth below. The preferred method provides a plurality of plain ordinary telephone service connections 12 connected with a fixed cellular switch 28. The fixed cellular switch 28 is connected with a control unit 30 for controlling operation of the fixed cellular switch 28. In addition, a plurality of cellular terminals 20 are provided that are connected with the fixed cellular switch 28 and the control unit 30. As illustrated in FIG. 2, an indexed array of connection identification numbers 18 is provided and each connection identification number is associated with a single plain ordinary telephone service connection 12. The indexed array of connection identification numbers 18 has an upper identification number range 14 and a lower identification number range 16. In operation, the present method utilizes the cellular terminals 20 to compare an incoming page with the upper identification number range 14 and the lower identification number range 16 to determine if the incoming page falls within said upper identification number range 14 and the lower identification number range 16. If the incoming page falls within the upper identification number range 14 and the lower identification number range 16, it identifies a validly paged plain ordinary telephone service connection 12 and, therefore, the multiline fixed cellular system 10 connects the validly paged plain ordinary telephone service connection 12 with an available cellular terminal 20.

The multiline fixed cellular system 10 ignores all of the incoming pages that fall outside the upper identification number range 14 and the lower identification number range 16. While not conducting a call, the cellular terminals 20 camp on a control channel through which a plurality of incoming pages are being received at a high rate of speed. The preferred method of controlling the multiline fixed cellular system 10 may further utilize the difference between the upper identification number range 14 and the incoming page to determine if the incoming page is identifying a valid plain ordinary telephone service connection 12 before signaling the control unit to connect a call.

In operation, the plurality of cellular terminals 20 monitor a control channel on which the incoming pages are sent to the plurality of cellular terminals 20 by the cellular network 16. Once the incoming page is determined to lie between the upper identification number range 20 and the lower identification number range 16, the cellular terminals 20 only need to perform one step in order to determine if the incoming page is identifying a valid plain ordinary telephone service connection 12. If the incoming page identifies an inactive plain ordinary telephone connection 12, the plurality of cellular terminals 20 will disregard the incoming page. Therefore, during operation of the multiline fixed cellular network 10, the plurality of cellular terminals 20 are able to connect an incoming call from a communication device connected to a public switched telephone network 32 with a selected plain ordinary telephone service connection 12.

Figure 4:
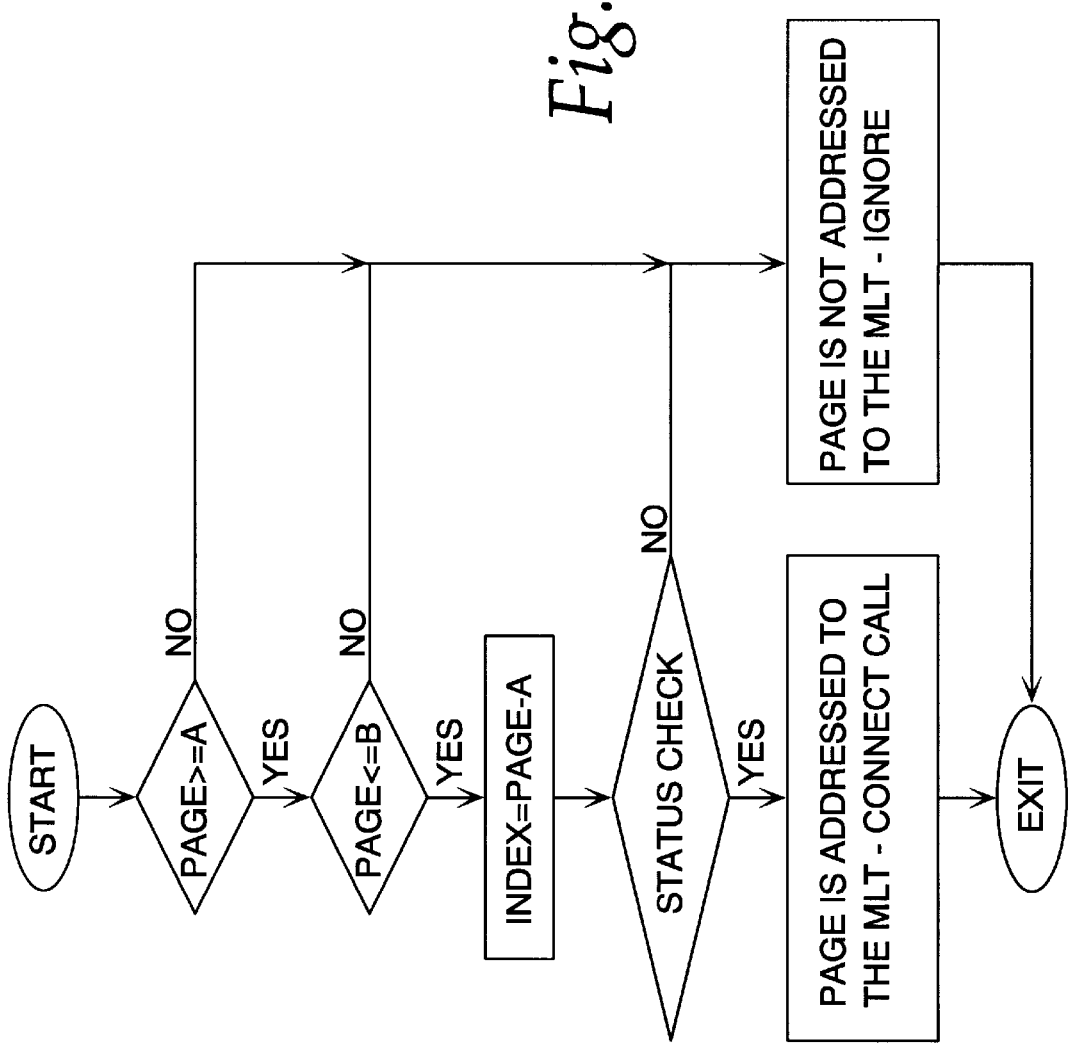
FIG. 4 is a flow chart depicting the processing steps each cellular terminal performs with an incoming page.

The present invention is able to quickly determine if an incoming page is meant for the multiline fixed cellular system 10 by performing two simple operations. As depicted in FIG. 4, if an incoming page is greater than or equal to the upper identification number range 14 and less than or equal to the lower identification number range 16, the cellular terminal 20 can immediately verify that the incoming page is meant for the multiline fixed cellular system 10. The cellular terminals 20 are capable of quickly indexing the control unit 30 to connect an available cellular terminal 20 to the paged plain ordinary telephone service connection 12 by utilizing the difference between the upper identification number range 14 and the incoming page to determine if the incoming page is a valid identification number. As previously stated, the status of an identification number would be controlled by the operator of the multiline fixed cellular system 10. If the operator has placed the identification number in an invalid status, the cellular terminals 20 can be programmed to ignore the incoming pages to that plain ordinary telephone service connection 12. The multiline fixed cellular system 10 always ignores incoming pages falling outside of the upper identification number range 14 and the lower identification number range 16. Therefore, the multiline fixed cellular system 10 provides an efficient method that overcomes the problems associated with prior art methods of scanning pages by shortening the processing time necessary for the cellular terminals 20 to scan incoming pages.

Another embodiment of the present invention discloses a multiline fixed cellular communication system 10 that comprises a plurality of plain ordinary telephone service connections 12 having an upper identification number range 14 and a lower identification number range 16. A fixed cellular switch 28 is connected with each of said plurality of plain ordinary telephone service connections 12. A control unit 30 is also connected with the fixed cellular switch 28. A plurality of cellular terminals 20 are connected with the fixed cellular switch 28 and the control unit 30. In operation, the control unit 30 utilizes the fixed cellular switch 28 to connect a validly paged plain ordinary telephone service connection 12 with an available cellular terminal 20.

The multiline fixed cellular communication system utilizes each of the plurality of cellular terminals 20 to scan a plurality of incoming pages and notifies the control unit 30 of a validly paged plain ordinary telephone service connection 12. A validly paged plain ordinary telephone service connection 12 is identified by an incoming page falling within the upper identification number range 14 and the lower identification number range 16. Each of the plurality of cellular terminals 20 utilizes the difference between the upper identification number range 14 and the incoming page to identify the validly paged plain ordinary telephone service connection 12. During operation, each of the plurality of cellular terminals 20 ignores the incoming page if the multiline fixed cellular communication system 10 has placed the validly paged plain ordinary telephone service connection 12 on an inactive status.

It is to be understood that a wide range of changes and modifications to the embodiments described above will be apparent to those skilled in the art and are contemplated. It is, therefore, intended that the foregoing detailed description be regarded as illustrative rather than limiting, and that it also be understood that it is the following claims, including all equivalents, that are intended to define the spirit and scope of the invention.

What is claimed is:

1. A method of scanning incoming pages in a multiline fixed cellular network, comprising the steps of:

providing a plurality of plain ordinary telephone service connections indexed within an upper page range and a lower page range;

providing a plurality of cellular terminals in radio communication with a cellular network;

connecting said cellular terminals with a means for selectively connecting a validly paged plain ordinary telephone service connection with an available cellular terminal;

comparing a plurality of incoming pages with said upper page range and said lower page range with said cellular terminals to identify incoming pages within said upper and lower page ranges;

utilizing the difference between said identified incoming pages and one of said lower and upper Page ranges to determine a validly paged plain ordinary telephone service connection; and connecting said determined validly paged plain ordinary telephone service connection with said available cellular terminal.

2. The method of claim 1, wherein the step of utilizing the difference between said identified incoming pages and one of said lower and upper image ranges to said validly paged plain ordinary telephone service connection compares the difference between said identified incoming pages and said upper page range.

3. The method of claim 1, further comprising the step of ignoring said incoming pages falling outside said upper page range and said lower page range.

4. A method of scanning incoming pages in a multiline fixed cellular network, comprising the steps of:

providing a plurality of plain ordinary telephone service connections indexed within an upper page range and a lower page range;

providing a plurality of cellular terminals in radio communication with a cellular network;

connecting said cellular terminals with a means for selectively connecting a validly paged plain ordinary telephone service connection with an available cellular terminal;

comparing a plurality of incoming pages with said upper page range and said lower page range with said cellular terminals;

comparing the difference between said upper page range and said incoming page to notify a user of an invalidly paged plain ordinary telephone service connection; and connecting said validly paged plain ordinary telephone service connection with said available cellular terminal.

5. The method of claim 4 wherein said invalidly paged plain ordinary telephone service connection comprises an inactive plain ordinary telephone service connection.

6. The method of claim 1 wherein said step of selectively connecting a paged plain ordinary telephone service connection with an available cellular terminal is performed by a control unit connected with a fixed cellular switch.

7. The method of claim 6 wherein said control unit operates said fixed cellular switch to connect said validly paged plain ordinary telephone service connection with an available cellular terminal.

8. The method of claim 1 wherein said cellular network is connected with a public switched telephone network.

9. A method of controlling a multiline fixed cellular system, comprising the steps of:

providing a plurality of plain ordinary telephone service connections connected with a fixed cellular switch, said fixed cellular switch having a control unit;

providing a plurality of cellular terminals connected with said fixed cellular switch and said control unit;

providing an indexed array of connection identification numbers assigned to each of said plain ordinary telephone service connections having an upper identification number range and a lower identification number range;

utilizing said cellular terminals to compare an incoming page with said upper identification number range and said lower identification number range to determine if said incoming page falls within said upper identification number range and said lower identification number range;

utilizing the difference between said incoming page determined to fall within said upper identification number range and said lower identification number range and one of said lower and upper image ranges to determine a validly paged plain ordinary telephone service connection; and connecting a determined validly paged plain ordinary telephone service connection with an available cellular terminal if said incoming page.

10. The method of claim 9, further comprising the step of ignoring all of said incoming pages falling outside said upper identification number range and said lower identification number range.

11. The method of claim 9, wherein the step of utilizing the difference between said incoming page determined to fall within said upper identification number range and said lower identification number range and one of said lower and upper page ranges compares the difference between said determined incoming page and said upper page range to determine if said incoming page is identifying a valid plain ordinary telephone service connection before signaling the control unit to connect a call.

12. The method of claim 11, further comprising the step of disregarding said incoming page if said incoming page identifies an inactive plain ordinary telephone service connection.

13. The method of claim 9 wherein said cellular network is connected with a public switched telephone network.

14. A method of scanning pages in a multiline fixed cellular system, comprising the steps of:
  providing a plurality of plain ordinary telephone service connections connected with a fixed cellular switch, said fixed cellular switch being connected with a control unit;
  providing a plurality of cellular terminals in radio communication with a cellular network connected with said fixed cellular switch and said control unit;
  assigning each of said plain ordinary telephone service connections an identification number falling within an upper identification number range and a lower identification number range;
  monitoring a plurality of incoming pages with a dedicated control channel on said cellular terminals; and
  connecting an available cellular terminal with a paged plain ordinary telephone service connection if an incoming page falls within said upper identification number range and said lower identification number range and the difference between one of said upper and lower identification numbers and said incoming page indicates that said incoming page is a valid identification number.

15. The method of claim 14 wherein said incoming page is indicated to be a valid identification number by the difference between said upper identification number and said incoming page.

16. The method of claim 15 further comprising the step of ignoring a valid identification number that has been disactivated by the multiline fixed cellular system.

17. The method of claim 14 further comprising the step of ignoring said incoming pages falling outside of said upper identification number range and said lower identification number range.

18. The method of claim 14 wherein said cellular network is connected with a public switched telephone network.

19. A multiline fixed cellular communication system, comprising:
  a plurality of plain ordinary telephone service connections having an upper identification number range and a lower identification number range;
  a fixed cellular switch connected with each plain ordinary telephone service connection;
  a control unit connected with said fixed cellular switch;
  a plurality of cellular terminals connected with said fixed cellular switch and said control unit, each of said cellular terminals scanning incoming pages to identify pages falling within said upper identification number range and said lower identification number range and characterizing the identified incoming pages as validly paged plain ordinary telephone service connections based on the difference between said identified incoming sages and one of said upper and lower identification number range; and
  wherein said control unit utilizes said fixed cellular switch to connect said validly paged plain ordinary telephone service connection with an available cellular terminal.

20. The multiline fixed cellular communication system of claim 19, wherein each of said plurality of cellular terminals scans a plurality of incoming pages and notifies said control unit of said validly paged plain ordinary telephone service connection.

21. The multiline fixed cellular communication system of claim 20, wherein said validly paged plain ordinary telephone service connection is an incoming page falling within said upper identification number range and said lower identification number range.

22. A multiline fixed cellular system, comprising:
  a plurality of plain ordinary telephone service connections having an upper identification number range and a lower identification number range, where a validly paged lain ordinary telephone service connection is an incoming page falling within said upper identification number range and said lower identification number range;
  a fixed cellular switch connected with each plain ordinary telephone service connection;
  a control unit connected with said fixed cellular switch;
  a plurality of cellular terminals connected with said fixed cellular switch and said control unit, wherein each of said plurality of cellular terminals
    scans a plurality of incoming pages,
    utilizes the difference between the upper identification number range and said incoming page to identify the validly paged plain ordinary telephone service connection, and
    notifies said control unit of said validly paged plain ordinary telephone service connection; and
  wherein said control unit utilizes said fixed cellular switch to connect a validly paged plain ordinary telephone service connection with an available cellular terminal.

23. The multiline fixed cellular communication system of claim 22, wherein each of said plurality of cellular terminals ignores said incoming page if the multiline fixed cellular communication system has placed said validly paged plain ordinary telephone service connection on an inactive status.

* * * * *